United States Patent
Kotwicki et al.

(10) Patent No.: US 6,553,817 B1
(45) Date of Patent: Apr. 29, 2003

(54) METHOD AND APPARATUS FOR MONITORING A CATALYTIC CONVERTER

(75) Inventors: Allan Joseph Kotwicki, Williamsburg, MI (US); Ross Dykstra Pursifull, Dearborn, MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/442,703

(22) Filed: Nov. 18, 1999

(51) Int. Cl.[7] .............................................. G01M 19/00
(52) U.S. Cl. ...................................... 73/118.1
(58) Field of Search ............................. 73/23.31, 23.32, 73/118.1, 117.3; 60/276, 277; 340/438, 439; 701/109, 30, 31

(56) References Cited

U.S. PATENT DOCUMENTS

| | | | |
|---|---|---|---|
| 5,259,189 A | * | 11/1993 | Baier et al. .................... 60/277 |
| 5,732,551 A | * | 3/1998 | Naber et al. ................... 60/277 |
| 5,865,026 A | * | 2/1999 | Davey et al. .................. 60/277 |
| 5,869,743 A | * | 2/1999 | Jones et al. ................. 73/23.31 |
| 5,953,905 A | * | 9/1999 | Jerger et al. ................... 60/277 |

* cited by examiner

Primary Examiner—William Oen
(74) Attorney, Agent, or Firm—Visteon Global Tech., Inc.

(57) ABSTRACT

A monitor 10 is provided of the type which is deployed upon a vehicle 13 having an engine 17, an exhaust system 27 which includes a catalytic converter 12. Catalytic converter 12 is operatively and communicatively connected to inlet portion or pipe 14 and outlet portion or pipe 16. Monitor assembly 10 employs sensors 24–26 which are electrically and communicatively connected to controller 28 to operatively determine whether the catalytic converter 12 is operational.

20 Claims, 5 Drawing Sheets

METHOD AND APPARATUS FOR
MONITORING A CATALYTIC CONVERTER

FIELD OF THE INVENTION

The present invention relates to a method and an apparatus for monitoring a catalytic converter and more particularly, to a method and an apparatus which employs several sensors which cooperatively gather exhaust gas data and which analyze the gathered data in order to determine whether the catalytic converter is properly functioning and/or operating.

BACKGROUND OF THE INVENTION

Monitoring apparatuses or assemblies and methods for employing or utilizing such monitoring apparatuses or assemblies allow for the selective monitoring of certain vehicle systems or components, effective to determine and/or ensure that such systems and/or components are properly functioning. Particularly, it is desirable to monitor such vehicle systems or components in order to quickly identify system and/or component failure and/or malfunction and to provide notification of such a failure or malfunction to an operator and/or user of a vehicle in order to allow the failure and/or malfunction to be readily and properly corrected and/or addressed. One type of vehicular system which may be desired to be monitored in this manner is a vehicular exhaust system of the type which includes a catalytic converter.

In a conventional combustion engine, air and fuel are selectively injected or placed into several combustion chambers and are operatively mixed or combined. The air and fuel combination or mixture is then ignited, in each chamber, thereby causing the mixture to combust within each of the combustion chambers and "driving" or moving the pistons which are operatively and respectively disposed within the chambers. The "byproducts" or "exhaust gas", which is produced and/or formed by the combusted air and fuel mixture, exits or leaves the combustion chambers and flows or travels to the exhaust manifold. The exhaust manifold then typically communicates the received combustion byproducts or exhaust gas to the catalytic converter where the "byproducts" are "treated" in a conventional manner and communicated to a vehicle exhaust assembly.

When the ratio of air to fuel within the combustion chambers is "optimum" or "ideal", the produced exhaust gas is composed primarily of carbon dioxide and water. When this ratio is "rich" (i.e., when the combustion chambers contain a substantially larger amount of fuel than is "optimal" or "ideal") or is "lean" (i.e., when the combustion chamber contains substantially less fuel than is "optimal" or "ideal"), the exhaust gas contains certain undesirable constituents. Typically, these undesirable constituents include "oxidants" and/or "reductants".

Within the catalytic converter, the received oxidants or reductants react with certain contained reaction-causing elements or "catalysts". For example and without limitation, the catalysts cause the received oxidants to be operatively "stored" within the catalytic converter until reductants are produced by the previously delineated combustion process and is communicated to the catalytic converter. The catalysts then cause the stored oxidants to react with the subsequently communicated reductants to desirably produce carbon dioxide and water. When the catalytic converter is not working properly, this desired reaction no longer takes place and various types of undesirable elements or materials are produced and are discharged or emitted from the catalytic converter.

It is therefore desirable to monitor the effectiveness or operability of the catalytic converter. More particularly, it is desirable to detect or monitor the catalytic converter in order to determine whether the catalytic converter is and/or remains effective to produce the desired emissions. When the catalytic converter is no longer producing the required emissions, it is desirable to detect this condition, to inform an operator/user of the vehicle of this condition, and to replace the catalytic converter.

Prior "strategies" and/or monitor assemblies have been used or employed to detect the continued effectiveness or operability of a catalytic converter. Many of these prior methods or strategies require the acquisition of relatively extensive amounts of data which is often obtained by intrusively "modifying" or placing sensors and/or components within the catalytic converter. The obtained data is then utilized to determine the effectiveness of the catalytic converter. Further strategies include removing the catalytic converter from the vehicle and performing operability tests on the catalytic converter.

These prior catalytic converter monitoring systems, methods, and/or strategies have certain drawbacks. For example and without limitation, many of these prior systems, strategies, and processes are relatively costly and expensive to implement and perform, and require the vehicle to be serviced and/or to be inoperative (e.g., the vehicle is inoperative when the catalytic converter is removed from the vehicle). Furthermore, many of these prior systems, strategies, and processes are relatively difficult to use, relatively time consuming to employ, and require attachment to and/or modification of the catalytic converter or certain portions of the converter. Moreover, such prior catalytic converter monitoring systems are substantially and undesirably intrusive to the vehicle exhaust system and/or to the overall operation of the vehicle.

There is therefore a need to provide a method and apparatus for monitoring a catalytic converter which overcomes some or all of the previously delineated drawbacks and which selectively allows for the monitoring of a catalytic converter in a relatively efficient, cost-effective, relatively easy, and non-intrusive manner.

SUMMARY OF THE INVENTION

It is a first object of the present invention to provide a method and apparatus to monitor a catalytic converter which overcomes some or all of the previously delineated drawbacks of prior catalytic converter monitoring methodologies and/or strategies.

It is a second object of the invention to provide a method and apparatus for monitoring a catalytic converter which overcomes some or all of the previously delineated drawbacks of prior catalytic converter monitoring methodologies and/or strategies, and which efficiently and reliably detects or determines whether the catalytic converter is and/or remains operable.

It is a third object of the invention to provide a method and apparatus for monitoring a catalytic converter which detects the effectiveness of the catalytic converter in a manner which is non-intrusive to a vehicle, to the vehicle operation, and/or to the vehicle exhaust system.

It is a fourth object of the invention to provide a method and apparatus for monitoring a catalytic converter which detects the effectiveness of the catalytic converter in a manner which is cost-effective and which is relatively easy to employ.

It is a first aspect of the invention to provide an apparatus for use in combination with a catalytic converter of the type which selectively receives a first material and which uses the received first material to create and output a second material, the catalytic converter having a sensor which uses the second material to create and output a signal. The apparatus comprises a controller which is communicatively coupled to the sensor, which receives the signal, and which compares the signal to at least one value, and, based upon the comparison, determines whether the catalytic converter is operational.

It is a second aspect of the invention to provide a method for monitoring a catalytic converter having an inlet portion and a first outlet portion and operatively connected to an engine having an air intake portion and a second outlet portion communicatively connected to the first inlet portion; providing a first sensor which is operatively connected to the first outlet portion, and which generates a first signal; providing a second sensor which is communicatively coupled to the air inlet portion, and which generates a second signal; providing a controller, effective to receive and utilize the first and second signals, thereby determining if the catalytic converter is operational.

These and other features, aspects, and advantages of the invention will become apparent by reading the following specifications and by reference to the following drawings.

DETAILED DESCRIPTION OF THE PREFERRED EMBODIMENT OF THE INVENTION

Figure 1:
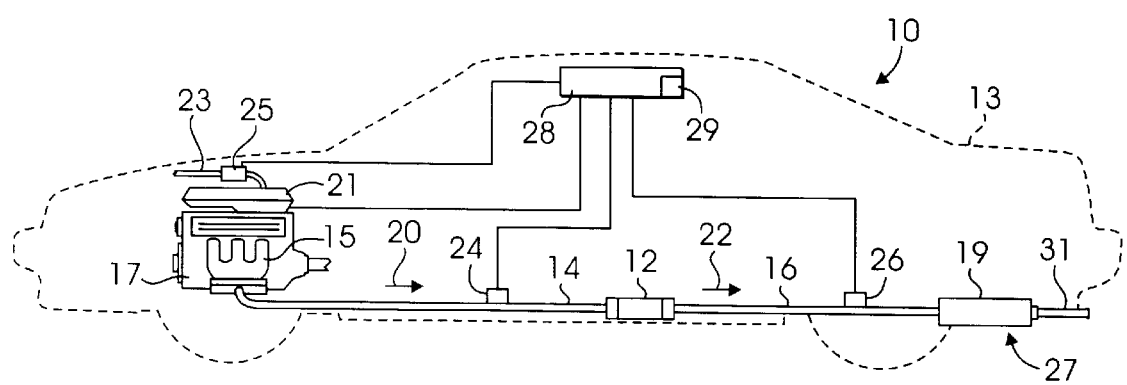
FIG. 1 is a block diagram of a catalytic converter monitoring apparatus which is employed within a vehicle and which is produced and/or formed in accordance with the teachings of the preferred embodiment of the present invention.

Referring now to FIG. 1, there is shown a catalytic converter monitoring assembly or apparatus or "monitor" 10 which is produced and/or formed in accordance with the teachings of the preferred embodiment of the invention. As shown in FIG. 1, monitor 10 is deployed upon and/or within a vehicle 13 of the type having a conventional and commercially available catalytic converter 12 which is generally and operatively connected to a conventional vehicle exhaust system 27. While the following discussion describes the use of monitor 10 in connection with vehicle 13 and exhaust system 27, it should be appreciated that monitor 10 may be operatively deployed upon and/or used in combination with virtually any type of vehicle and/or in combination with any type of exhaust system which includes a catalytic converter.

Monitor 10 includes a conventional micro-processor, micro-controller, or controller 28 having a memory unit 29, sensors 24, 26, which are physically and communicatively coupled to exhaust system 27, and an airflow meter or sensor 25 which is physically and communicatively coupled to and/or disposed within conventional vehicle air intake portion 23. Sensors 24–26 are electrically and communicatively coupled to controller 28. As discussed more fully and completely below, controller 28 receives signals from sensors 24–26, and based upon the values of these signals, determines the "effectiveness" of the catalytic converter 12.

Exhaust system 27 includes an inlet portion or pipe 14 which is operatively and integrally connected, attached, or coupled to the catalytic converter 12 and which communicatively connects, couples, or attaches the catalytic converter 12 to an exhaust manifold 15. It should be appreciated that "engine emissions" or "combustion byproducts" are communicated from the engine 17 of vehicle 13 to the exhaust manifold 15, and are further communicated through the inlet portion or pipe 14 to the catalytic converter 12 in the general direction of arrow 20.

Output portion or pipe 16 is operatively and integrally connected, coupled, or attached to the catalytic converter 12 and communicatively connects, couples, or attaches catalytic converter 12 to the exhaust muffler 19. Muffler 19 further communicates with the atmosphere or environment outside of or external to the vehicle 13, by way of a discharge pipe or member 31.

When catalytic converter 12 is functioning properly, "converted" or desirably treated combustion byproducts or emissions exit, "leave", or "flow" out of the catalytic converter 12 through outlet pipe or portion 16, are then communicated, in the general direction of arrow 22, to the muffler 19, and are expelled, emitted, or communicated to the atmosphere through pipe or portion 31.

Engine 17 includes several conventional fuel injectors 21 which operatively and selectively pump or inject fuel into the engine 17, and an "air-intake" portion or member 23 which operatively and selectively injects, pumps, or communicates ambient air into the engine 17. A conventional "air meter" or sensor 25 is physically attached or connected to "air-intake" portion 23, is electrically and communicatively coupled to controller 28, and is effective to communicate, transmit, or send airflow data to controller 28 (i.e., data representing the amount of air which is being provided to the combustion chambers). It should be appreciated that controller 28 utilizes the data provided or gathered by airflow meter or sensor 25 to cause the fuel injectors 21 to inject a desired amount of fuel into the engine 17 (e.g., into the various combustion cylinders of the engine 17).

In the preferred embodiment, controller 28 may include one or more micro-processors or integrated circuits which cooperatively execute or perform much of the processing functionality which is more fully delineated below. Memory 29 may comprise a conventional memory unit including both "permanent" memory and volatile or "temporary" memory, and is adapted to and does store at least a portion of the operating software which directs the operation of controller 28. Moreover, memory 29 is also adapted to selectively store other types of data or information, including certain information associated with the overall operation of apparatus/assembly 10 and/or historical data, processing data, and/or operational data which is associated with apparatus/assembly 10. As will be more fully discussed below, examples of such data include, but are not limited to, the current "efficiency or operability" of catalytic converter 12, and the status of sensors 24–26. Moreover, as should also be apparent to those of ordinary skill in the art, controller 28 and memory 29 may actually comprise commercially available, conventional, and disparate chips or devices, which are operatively and communicatively linked in a cooperative functioning and operational manner.

Sensor 24 is operatively attached, coupled, or connected to the inlet portion or pipe 14 in a known and conventional manner. In one non-limiting embodiment, sensor 24 comprises a conventional and commercially available "exhaust gas oxygen" sensor or "EGO" sensor. In a further non-limiting embodiment of the invention, sensor 24 comprises a conventional and commercially available "heated exhaust gas oxygen" sensor or "HEGO" sensor. Sensor 24 is adaptably designed to operatively monitor the chemical composition of the combustion byproducts or exhaust gas which is/are selectively emitted by the engine 17 and communicated to pipe 14. More particularly, sensor 24 monitors the chemical composition and/or oxygen gas concentration of the combusted byproducts or exhaust gas to determine or measure the "oxidant/reductant" composition or concentration contained within the combustion byproducts or the exhaust gas before those combustion byproducts are communicated to or allowed to enter or flow into the catalytic converter 12.

Sensor 24 is further operatively, communicatively, and electrically connected to controller or controller assembly 28. More particularly, sensor 24 collects data by monitoring the combustion byproducts or exhaust gas which flow or communicate through pipe or portion 14 in the direction of arrow 20, and communicates or transmits the collected data to the controller or controller assembly 28.

In one non-limiting embodiment, sensor 24 collects or detects chemical composition or exhaust gas data from pipe or portion 14, which is produced in "analog" form. The controller or controller assembly 28 converts this analog data to "digital" type data in a conventional manner (e.g., by way of an analog-to-digital converter), and processes the data by way of one or more stored programs or algorithms. This data is stored, processed, analyzed, plotted, and/or used in a manner effective to allow controller 28 to communicate desired fuel input levels or changes to the fuel injectors 21. This allows controller 28 to change the fuel quantity being injected, pumped, or communicated into the engine 17, by fuel injectors 21, and allows for more desirable combustion byproducts or exhaust gas emissions to be produced and/or formed by the engine 17.

Monitor 10 further includes a sensor 26 which is attached, coupled, or connected to the outlet portion or pipe 16 in a known and conventional manner. In one non-limiting embodiment, sensor 26 comprises a conventional and commercially available "exhaust gas oxygen" sensor or "EGO" sensor. In a further non-limiting embodiment of the invention, sensor 26 comprises a conventional and commercially available "heated exhaust gas oxygen" sensor or "HEGO" sensor. In a further non-limiting embodiment of the invention, sensor 26 is substantially similar or identical to sensor 24. Sensor 26 is adaptably designed to operatively monitor the chemical composition of the catalytic converter emissions or exhaust gas (e.g., those combustion byproducts which exit the catalytic converter 12 through pipe or portion 16).

Sensor 26 is operatively, communicatively, and electrically connected to controller or controller assembly 28. More particularly, sensor 26 collects data by monitoring the exhaust gas which flows or communicates from the catalytic converter 12 to or through the pipe or portion 16 in the direction of arrow 22, and communicates or transmits the exhaust gas composition data to the controller or controller assembly 28. In one non-limiting embodiment, sensor 26 provides the measured, collected, or detected chemical composition data from pipe or portion 16 and provides produces the gathered data in an "analog" type format. The controller or controller assembly 28 converts this analog data to "digital" data (e.g., by way of a conventional analog-to-digital converter). This data is then stored, processed, analyzed, and/or used in a manner effective to allow controller assembly 28 to communicate, to fuel injectors 21, the "change" or "correction" in the amount of fuel, which needs to be injected by the fuel injectors 21, in order to desirably "harmonize" or "equalize" the fuel-to-air combustion ratio, thus producing desired exhaust gas emissions.

Figure 2:
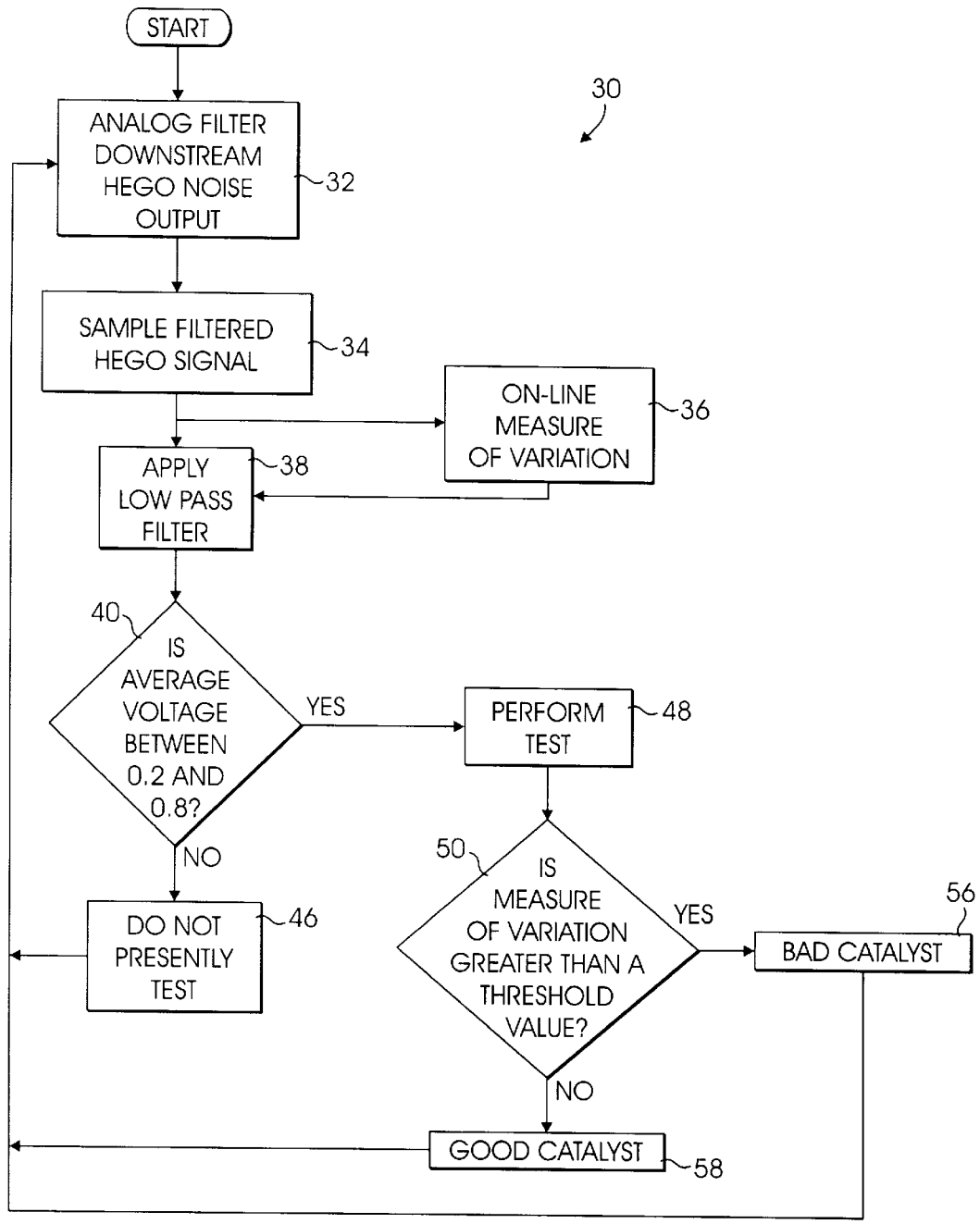
FIG. 2 is a control diagram or flow chart which illustrates the process or method used by the apparatus shown in FIG. 1.

The functionality of monitor apparatus 10 is best shown by the control diagram or flow chart 30, which is illustrated in FIG. 2. The process or method illustrated within diagram or flow chart 30 more specifically delineates those functional steps which are performed by monitor 10 to determine the effectiveness or operability of the catalytic converter 12 (e.g., to determine whether the catalytic converter 12 is producing the desired emissions and is properly operating). As shown in functional block or step 32, the signal generated by sensor 26 is communicated to controller 28. Specifically, controller 28 receives the signal from sensor 26 (i.e., typically comprising a voltage type signal) and utilizes a conventional analog filter (not shown) in order to substantially eliminate or "filter out" any high frequency "noise" present within the received signal (i.e., random voltage variation not directly related to the signal output). In one non-limiting embodiment of the invention, the filter applied by controller 28 to the signal received from sensor 26 limits the frequency content of the received signal by filtering noise or unwanted portions of the signal which are above about five hundred hertz. Other filter threshold values may be utilized. Once the signal from sensor 26 is received by controller 28, it is digitized, by a conventional analog to digital converter and then placed within memory portion or region 29, as illustrated by functional block or step 34.

Controller 28 then proceeds to functional block or step 36 to record an "online measure of variation". More particularly, controller 28 takes samples of the data which reside with memory portion 29 and processes the data according to a stored algorithm which determines the measure of variation of the signal data (e.g., the range or amount of the standard deviation of the collected data). In one non-limiting embodiment, this measure is determined while the data is being collected and communicated to controller 28 by the sensor 26 (e.g., while sensor 26 is "online").

Controller 28 then proceeds to functional block or step 38 and applies a "low pass" filter to the digitized data which is stored within memory portion 29. More specifically, the data is filtered by a conventional low pass filter algorithm to substantially discard undesirable information content or noise which exists within the stored data. Controller 28 then utilizes the filtered data to determine an average value of the sensor voltage received by controller 28. This average value may be obtained and/or calculated during a certain and programmable period of time (e.g., ten seconds).

The value of the average sensor voltage is then analyzed, by controller 28, as shown within block 40. Specifically, controller 28 determines whether the value of the average voltage which was produced and communicated by sensor 26 to controller 28 is between two tenths of a volt and eight tenths of a volt. If the controller 28 determines that the voltage is not between two tenths of a volt and eight tenths of a volt, then controller 28 determines that a test of the effectiveness or operability of the catalytic converter 12 need not be presently performed, as illustrated in functional block or step 46. If it is determined that a test of the catalytic converter 12 does not need to be presently performed, controller 28 returns to functional block or step 32 and "restarts" or begins the process illustrated by flow chart 30.

It should be appreciated that when the value of the average voltage, which is determined by controller 28, is greater than eight tenths of a volt or less than two tenths of a volt, "breakthrough" has occurred within the catalytic converter 10. At or during "breakthrough", the catalytic converter 12 is functioning properly, however, the reaction-causing elements or catalysts contained within the catalytic converter 12 are "full" of either oxidants or reductants. This condition respectively causes "unchanged" or "untreated" reductants or oxidants to communicate or flow through the catalytic converter 12 and into the atmosphere.

Hence, average voltage values greater than eight tenths of a volt or less than two tenths of a volt automatically indicate that the catalytic converter 12 is operating in a proper and desired manner, and that conditions or factors exist which cause "unchanged" oxidants or reductants to flow into the atmosphere. Thus, a value of average voltage of less than two tenths of a volt and greater than eight tenths of a volt, in the preferred embodiment of the invention, obviates the need to perform the test of the effectiveness or operability of the catalytic converter 12.

If controller 28 determines that the value of the average sensor voltage is between two tenths of a volt and eight tenths of a volt, controller 28 performs a test of the catalytic converter 12, as illustrated in functional block or step 48. That is, when the value of the average voltage produced or communicated by sensor 26 is between two tenths of a volt and eight tenths of a volt, the catalytic converter 12 may be inoperable (e.g., catalytic converter 12 may not be producing the desired exhaust gas emissions).

To determine whether the catalytic converter 12 is operable or working properly, controller 28 determines whether the measured or created value of variation in the voltage being produced by sensor 26, which was determined in step 36, is greater than a certain pre-defined threshold value. This threshold value may be a "constant" value and may reside within controller 28. In one non-limiting embodiment, this value is determined by testing catalytic converters of the type shown in FIG. 1 in a controlled environment.

If the value of the online variation is greater than the threshold value, controller 28 determines that the catalytic converter 12 has become inoperable or ineffective to produce the desired exhaust gas emissions, as shown in block 56. Monitor 10 may also provide an audio or visual indication of the determined inoperative or faulty catalytic converter 12 to the user and/or operator of the vehicle. If the value of online variation is not greater than the threshold value, the controller determines that the catalytic converter 12 is functional and operating in a desired manner, as shown in block 58. Once the controller 28 has determined whether the catalytic converter 12 is functional, controller 28 proceeds to functional block or step 32 and repeats the process.

Figure 3:
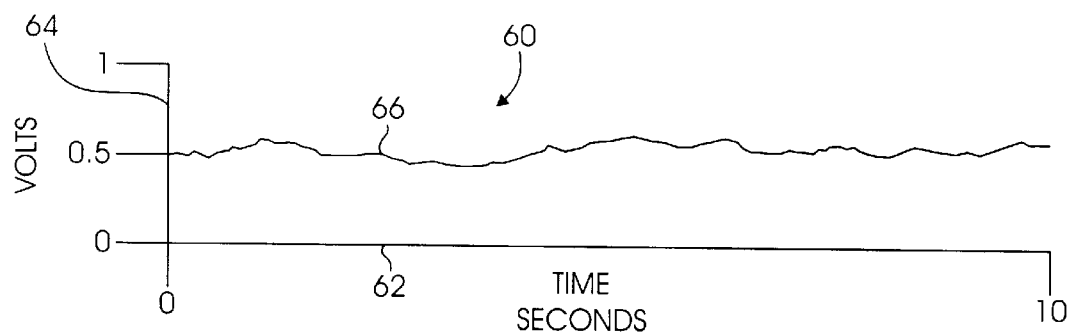
FIG. 3 is a chart or graph displaying certain voltage data which is produced and/or generated by the catalytic converter monitoring apparatus which is shown in FIG. 1.
Figure 4:
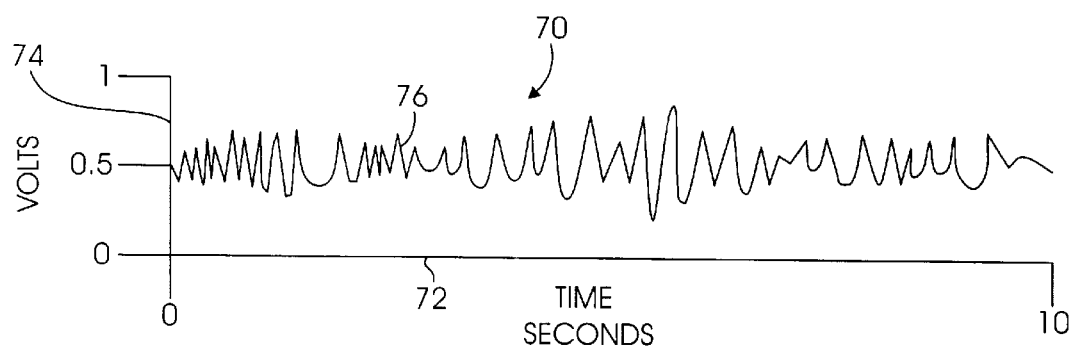
FIG. 4 is a chart or graph displaying certain voltage data which is produced and/or generated by the catalytic converter monitoring apparatus which is shown in FIG. 1.

The determination performed within functional block or step 50 may be graphically illustrated in FIGS. 3 and 4. An operable or "effective" catalytic converter 12 produces a chart or graph substantially similar to chart or graph 60 which is shown best in FIG. 3. In graph 60, time is plotted or graphed along the "x" axis 62 and the value of the average voltage is plotted or graphed along the "y" axis 64. When a catalytic converter 12 is operable or "effective" and the reaction-causing elements or catalysts contained within the catalytic converter 12 are functioning properly, the voltage signal emanating from sensor 26 and displayed within graph 60 remains relatively constant and is substantially equal to a value of about five tenths of a volt. The signal, as shown, has substantially little or no variation.

When the catalytic converter 12 is inoperable or "ineffective", the data obtained from sensor 26 resembles the data displayed by line 76, as illustrated within graph 70. As shown in graph 70, time is graphed or displayed on the "x" axis 72 and a the value of average voltage is graphed or displayed on the "y" axis 74. The data 76 from sensor 26, when plotted or graphed in chart or graph 70, differs substantially from the data plotted or graphed in chart or graph 60. More particularly, the data emanating from sensor 26 has an average voltage value, shown by way of example and without limitation with data line 76, data line 76 has a higher variation than does the average voltage value of data line 66, in graph 60, thereby indicating that the catalytic converter 12 is "inoperative".

It should be appreciated that monitor 10 may utilize controller 28 to concomitantly provide multiple desired functions for the operation of the vehicle 13, while allowing controller 28 to cooperatively utilize the data collected from sensor 26 to determine the effectiveness of the catalytic converter 12, according to the functional blocks or steps contained within flow chart 30, which is more fully delineated above. Furthermore, it should be appreciated that monitor 10 operatively determines the effectiveness of catalytic converter 12 in a manner which is relatively "non-intrusive" to the operation of the vehicle 13, and which is made cost-effective by selectively utilizing those components which are typically and commonly contained within vehicles of the type having a catalytic converter (e.g., EGO or HEGO sensors).

Figure 5:
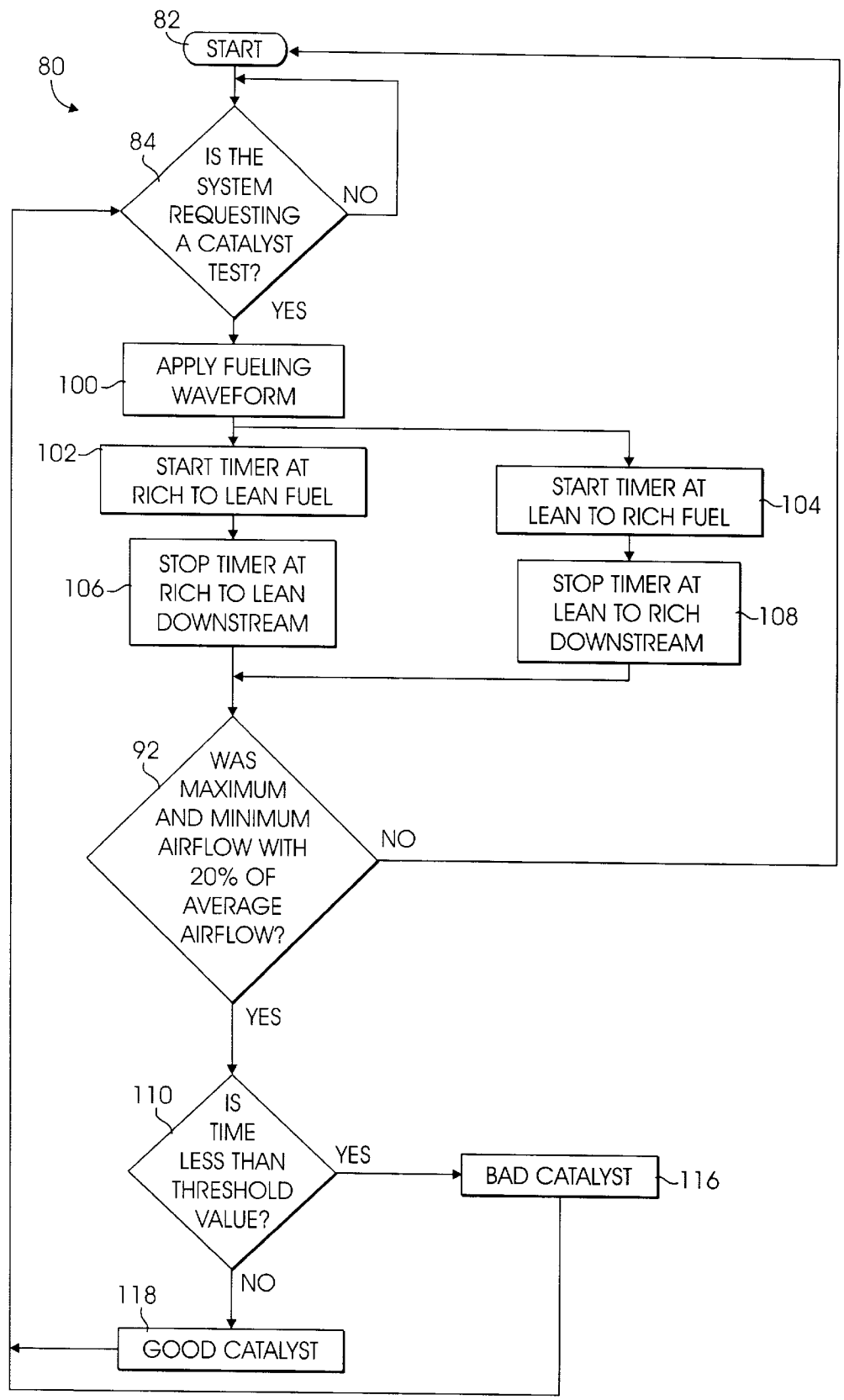
FIG. 5 is a control diagram or flow chart which illustrates a method or process for monitoring a catalytic converter according to the teachings of a second embodiment of the invention.

Referring now to FIG. 5, there is shown a control diagram or flow chart 80 which delineates an alternate method or process, used by monitor 10, for determining the effectiveness of catalytic converter 12. This non-limiting embodiment of the invention begins, as illustrated in functional block or step 84, when the controller 28 determines whether a test of the catalytic converter 12 is being requested by an operator and/or by other components/systems within vehicle 13. Alternately, such tests may be done, by monitor 10, during regular or programmed intervals of time.

If the controller 28 determines that a test of the catalytic converter 12 is requested, the controller 28 proceeds to functional block or step 100. To perform the test of the catalytic converter 12, controller 28 selectively and temporarily prevents the signals emanating from sensors 24, 26 to be used in the previously descirbed fuel control manner (e.g., controller 28 does not use the signals received from sensors 24, 26 to modify or control the rate that fuel is injected or placed within the engine 17). In this operation, controller 28 exclusively uses data from airflow meter or sensor 25 to regulate the fuel flow through fuel injectors 21 at an even ratio (e.g., a ratio of 1:1).

Figure 6:
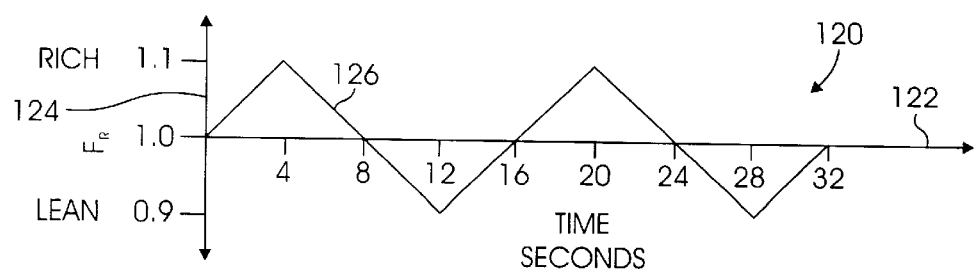
FIG. 6 is a chart or graph of relative fuel-air composition data which is produced and/or generated according to the process or method, which is illustrated in FIG. 5.

As shown within FIG. 6, controller 28 and airflow meter 25 cooperatively determine and regulate the relative fuel to air ratio from a "rich" state (e.g., too much fuel being injected within engine 17) to a "lean" state (e.g., not enough fuel being injected within engine 18). The acquired data from meter 25 is best shown in chart or graph 120, where the relative fuel to air ratio is plotted on the "y" axis 124 and the duration or period of time that the relative fuel to air ratio is determined by meter 25 is plotted on the "x" axis 122. The created data line 126, representing the data acquired by meter 25, crosses the "x" axis 122 at zero seconds when the acquired data line 126 indicates a change from "lean" state to "rich" state, and periodically crosses the "x" axis again (e.g., every eight seconds).

As illustrated in functional block or step 102, controller 28 starts a timer and records sensor data being produced by sensor 26 when the fuel wave 126 indicates a change from a "lean" state to a "rich" state, such as at point 127. Controller 28 then stops the timer, during step 106, when the signal from sensor 26 next indicates a change from a "rich" state to a "lean" state, such as at point 129, as shown in block 106.

As illustrated in functional blocks or steps 104, 108, the controller 28 also starts a separate timer and records the sensor voltage data being produced by sensor 26 when the data line 126 indicates a change from a "rich" state to a "lean" state, such as at point 131. Controller 28, as illustrated by functional block or step 108, stops the timer when the signal from sensor 26 indicates a change from a "lean" state to a "rich" state, such as at point 133.

In functional block or step 92, controller 28 receives airflow information from the airflow meter or sensor 25 and determines the maximum and minimum amount of airflow which occurred within portion 23 during the times that respectively elapsed between steps 102–106, and 104–108.

If, during each period of time defined by and elapsing during steps 102–106 and occurring and/or elapsing during steps 104, 108, the average airflow through portion 23, as determined by meter 25 and controller 28 is within twenty percent of either the maximum or minimum airflow during the elapsed time between steps 102 and 106 and during the elapsed time between steps 104 and 108, the controller 28 proceeds to functional step or block 110. If the average airflow is not within twenty percent of the maximum or minimum airflow during the time elapsed between steps 102 and 106 and steps 104 and 108, the controller 28 erases the data from the memory portion 29 and proceeds to functional block or step 82. Alternately, monitor 10 enters step 110.

In step 110, controller 28 determines a first elapsed time occurring between steps 102 and 106 and a second elapsed time occurring between steps 104 and 108. In one non-limiting embodiment, the first and second elapsed time values are substantially identical. Thus, the controller 28 determines whether each elapsed time value is less than a pre-determined threshold value. If not, the controller 28 concludes, as illustrated by functional block or step 118, that catalytic converter 12 is working properly (e.g., producing the desired emissions). If controller 28 determines that each elapsed time value is less than a pre-determined threshold value, the controller 28 determines, as illustrated in functional block or step 116, that the catalytic converter 12 is not functioning properly. Once a determination has been made in functional blocks or steps 116, 118, controller 28 proceeds to functional block or step 84, and determine if another test of the catalytic converter 12 has been requested.

Figure 7:
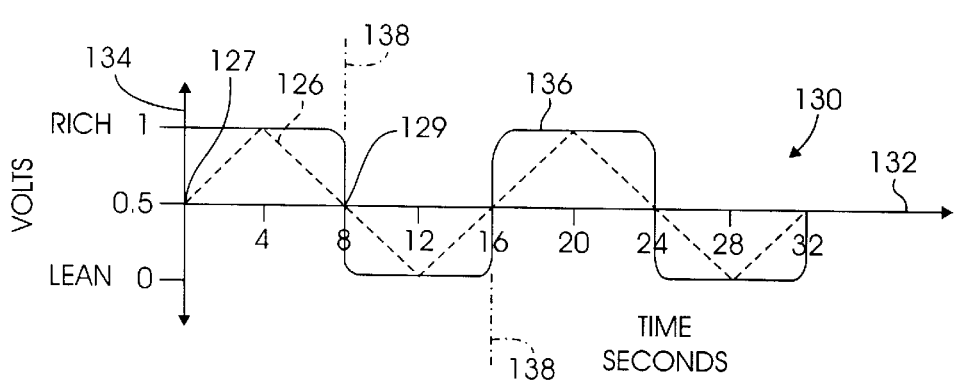
FIG. 7 is a chart or graph displaying voltage data produced and/or generated according to the process or method, which is illustrated in FIG. 5, when the catalytic converter is not functioning properly.
Figure 8:
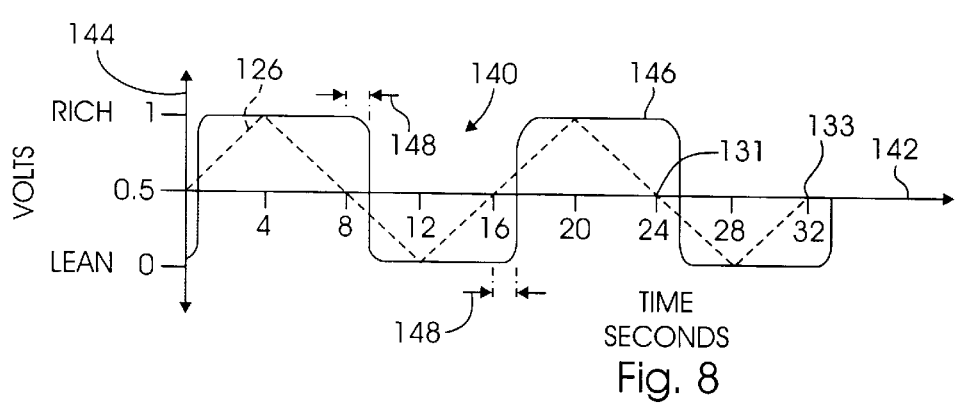
FIG. 8 is a chart or graph displaying voltage data produced and/or generated according to the process or method, which is illustrated in FIG. 5, when the catalytic converter is functioning properly.

Referring now to FIGS. 6–8, the data gathered by controller 28, when performing steps contained within functional blocks or steps 102–108, may be displayed graphically, as shown in charts or graphs 130, 140. Particularly, the signal data gathered by controller 28 from sensor 26 is displayed graphically in charts or graphs 130, 140. Within charts or graphs 130, 140, voltage from the sensor 26 is respectively plotted or graphed on the "y" axes 134, 144, and time is respectively plotted or graphed on the "x" axes 132, 142. Curve 136 represents the measured voltage from sensor 26 when the catalytic converter 12 is not functioning properly and curve 146 represents the measured voltage from sensor 26 when the catalytic converter is functioning properly.

As illustrated in charts or graphs 130, 140, when waveform 126 is overlaid, graphed, or plotted on the same graphs 130, 140 as the voltage from sensor 26 during the same period of time as lines 136, 146, the functionality associated with flowchart 80 may be relatively easily illustrated. As shown in graph 130, when the catalytic converter 12 is not functioning properly, the waveform 126 crosses the "x" axis 132 at substantially the same point or time as the voltage line 136. As shown, on chart or graph 130, there is substantially no time delay 138 between the crossing of line 126 and line 136 on the "x" axis 132 and thus, it can be determined that the catalytic converter 12 is not functioning properly.

As illustrated by graph 140, when line 126 and 146 do not cross the "x" axis 142 at the same point or time, there is a delay 148. It can be determined from the existence of delay 148 that the catalytic converter 12 is functioning properly.

Figure 9:
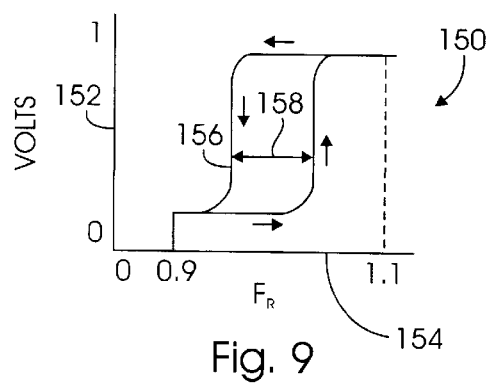
FIG. 9 is a chart or graph displaying voltage and relative fuel-air composition data produced and/or generated according to the process or method, which is illustrated in FIG. 5.

This delay 148 may also be demonstrated by graphing or plotting the air composition shown in chart or graph 120 versus the voltage signal emanating from sensor 26 and shown in chart or graph 140, thereby forming the curve 156, shown in graph 150, of FIG. 9. Particularly, chart or graph 150 illustrates "relative fuel to air composition" data on the "x" axis 154 and the voltage from the sensor 26 on "y" axis 152, thereby forming a conventional "hysteresis" curve 156. As illustrated in graph 150, hysteresis curve 156 has a width or diameter 158, which is substantially equal to the delay 148.

The width 158 indicates that the catalytic converter 12 is working properly (e.g., is producing the desired exhaust gas emissions) It should be appreciated that when the catalytic converter 12 is not working properly, the width or distance 158 of hysteresis curve 156 is substantially eliminated. It should be appreciated that a review of the data which is plotted or graphed in chart or graph 150 allows an operator and/or user to determine the effectiveness of the catalytic converter 12 in substantially the same manner employed by controller 28 within the process steps of flow chart 80.

It should be understood that in the preferred embodiment of the invention, controller 28 may be operatively programmed to perform the functions or steps which are described within flow chart 30 to determine whether the catalytic converter 12 is functioning properly. Controller 28, as illustrated by the second embodiment of the invention, may be alternately or concomitantly programmed to perform the functions which are illustrated by flow chart 80 to operatively determine whether the catalytic converter 12 is functioning properly.

It should be understood that the invention is not limited to the exact embodiment or construction which has been illustrated and described but that various changes may be made without departing from the spirit and the scope of the invention.

What is claimed is:

1. An apparatus for use in combination with a catalytic converter of the type which selectively receives a first material and which uses said received first material to create and output a second material, said catalytic converter having a sensor which uses said second material to create and output a voltage signal, said apparatus comprising:

a controller which is communicatively coupled to said sensor, which receives said voltage signal, which compares said voltage signal to at least one value, and based upon said comparison, determines whether said catalytic converter is operational;

wherein said controller measures an average voltage value of said voltage signal and compares said signal to said at least one value only when said average voltage value is within a certain value range.

2. The apparatus of claim 1 wherein said signal has a certain amount of variation and wherein said controller measures said certain amount of variation and uses said certain amount of variation to determine whether said catalytic converter is operational.

3. The apparatus of claim 2 wherein said second material has a certain amount of oxidant material and wherein said sensor measures said certain amount of oxidant material to create and output said signal.

4. The apparatus of claim 1 wherein said sensor comprises an exhaust gas oxygen sensor.

5. The apparatus of claim 2 wherein said controller filters said signal before measuring said certain amount of variation.

6. The apparatus of claim 1 wherein said signal comprises a voltage signal and wherein said controller measures an average voltage value of said signal and compares said signal to said at least one value only when said average voltage value is within a certain value range.

7. The apparatus of claim 1 wherein said certain value range comprises values which are between 0.2 and 0.8 volts.

8. A method for monitoring a catalytic converter having an inlet portion which is communicatively connected to an engine and an outlet portion, said method comprising the steps of:

providing a sensor which is operatively coupled to said outlet portion, and which produces a signal;

providing at least one value; and comparing said signal to said at least one value and, based upon said comparison, determining whether said catalytic converter is operational.

9. The method of claim 8 further comprising the step of filtering said signal.

10. A method for monitoring a catalytic converter having an inlet portion which is communicatively connected to an engine and an outlet portion, said method comprising the steps of:

providing a sensor which is operatively coupled to said outlet portion, and which produces a signal;

providing at least one value;

comparing said signal to said at least one value and, based upon said comparison, determining whether said catalytic converter is operational;

filtering said signal; and calculating an average value of said signal.

11. The method of claim 10 further comprising the steps of comparing said calculated average value to a predetermined value; and comparing said signal to said at least one value only when said average value is above said certain predetermined value.

12. The method of claim 11 further comprising the steps of providing a second predetermined value; and comparing said signal to said at least one value only when said average value is below said second predetermined value.

13. The method of claim 12 wherein said first predetermined value is equal to about 0.2 volts and wherein said second predetermined value is equal to about 0.8 volts.

14. A method for monitoring a catalytic converter having an inlet portion and an outlet portion and which is disposed within an engine having an air intake portion and a second outlet portion which is communicatively connected to said first inlet portion of said catalytic converter, said method comprising the steps of:

providing a first sensor operatively connected to said outlet portion of said catalytic converter, thereby generating a first signal;

providing a second sensor communicatively coupled to said air inlet portion, thereby generating a second signal;

providing a controller which receives said first and second signals and which uses said received first and second signals to determine whether said catalytic converter is operational;

wherein said first signal has a first value at a first time, wherein said second signal has a second value at a second time, and wherein said controller compares said first and second times.

15. The method of claim 14 wherein said first signal has a first value at a first time, wherein said second signal has a second value at a second time, and wherein said controller compares said first and second times.

16. The method of claim 15 wherein said controller determines said catalytic converter is faulty when said first and second times are equal.

17. The method of claim 16 wherein said controller determines that said catalytic converter is operational when said first and said second timers are unequal.

18. The method of claim 14 wherein said first sensor comprises an exhaust gas oxygen sensor.

19. The method of claim 14 wherein said first sensor comprises a heated exhaust gas oxygen sensor.

20. The method of claim 14 wherein said second sensor comprises an airflow meter.

* * * * *